340-870.12 SR CROSS REFERENCE SEARCH ROOM
XR 3,259,693
1x 1019Y

Inventor
H. WATANABE
By Arthur M. Lieberman
Agent

3259693
OR IN 179/15BN

Inventor
H WATANABE
By [signature]
Agent

July 5, 1966 HITOSHI WATANABE 3,259,693

FREQUENCY DIVISION MULTIPLEX COMMUNICATION SYSTEM

Filed Sept. 26, 1961 4 Sheets-Sheet 3

Inventor
H. WATANABE
By Arthur M. Lieberman
Agent

FREQUENCY DIVISION MULTIPLEX COMMUNICATION SYSTEM

Filed Sept. 26, 1961 4 Sheets-Sheet 4

Inventor
H. WATANABE
By [signature]
Agent

United States Patent Office 3,259,693

Patented July 5, 1966

3,259,693

FREQUENCY DIVISION MULTIPLEX COMMUNICATION SYSTEM

Hitoshi Watanabe, Tokyo, Japan, assignor to Nippon Electric Company, Limited, Tokyo, Japan, a corporation of Japan Filed Sept. 26, 1961, Ser. No. 141,278
Claims priority, application Japan, Sept. 28, 1960, 35/39,961
5 Claims. (Cl. 179—15)

This invention relates to a frequency division multiplex telecommunication system; particularly to such a transmission system as used with pulse code modulation (PCM) or data transmission; and more particularly to such a transmission system at microwave and millimeter wave frequencies. However, it is to be understood that this invention is not restricted to these systems.

Telecommunication by the utilization of pulses, particularly PCM, is a well developed field which by virtue thereof has been lately regarded as one of the best and most adaptable systems for the transmission of information. A PCM system may be readily converted into a multiplex communication system, namely, time-division multiplex (TDM)-PCM system; and through recent developments in the microwave and millimeter wave range, with their inherent wider frequency band, it is now even possible to tack on frequency division multiplex (FDM) to the other two and obtain a PCM-TD-FDM system.

However, in conventional FDM-PCM systems, or in general, in FDM communication systems, many defects are prevalent. These include: a number of oscillators, the frequencies of which are different from one another are required, corresponding to the number of channels; the frequency of each oscillator must be strictly stabilized; and consequently that, particularly in microwave or millimeter wave regions, the transmitting device costs are excessive; and the close tolerances present obvious technical difficulties in manufacture and maintenance.

In order to remove these defects, it is desirable that only a single pulse generator which generates a train of pulses, repeating with a predetermined time interval, having a flat power spectrum distribution in frequency, be employed as a carrier pulse current source instead of the number of oscillators previously employed. However, in the millimeter wave region, it is very difficult to provide such a pulse generator.

An object of the present invention is to provide a frequency division multiplex pulse communication system wherein a single white noise generator is employed instead of a number of very stabilized oscillators.

Another object of this invention is to provide an improved frequency division multiplex pulse communication system, using a single white noise generator, which is stable and economical, easy to maintain and has a larger output power.

It is still another object of this invention to provide a frequency division multiplex pulse communication system which assures stable operation, dependent only upon the relative stability of the filters which are employed in both the transmitting and receiving equipments.

The above mentioned and other features and objects of this invention and the manner of attaining them will become more apparent and the invention itself will best be understood by reference to the following description of an embodiment of the invention taken in conjunction with the accompanying drawings wherein.

Figure 3:
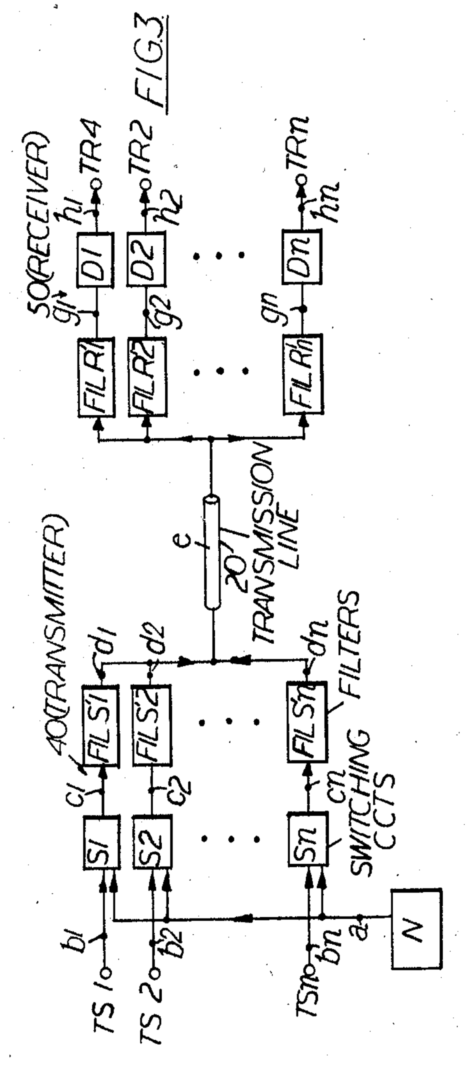
FIG. 3 is a block diagram of an embodiment of this invention.
Figures 6A, 6B, 7A, 7B:
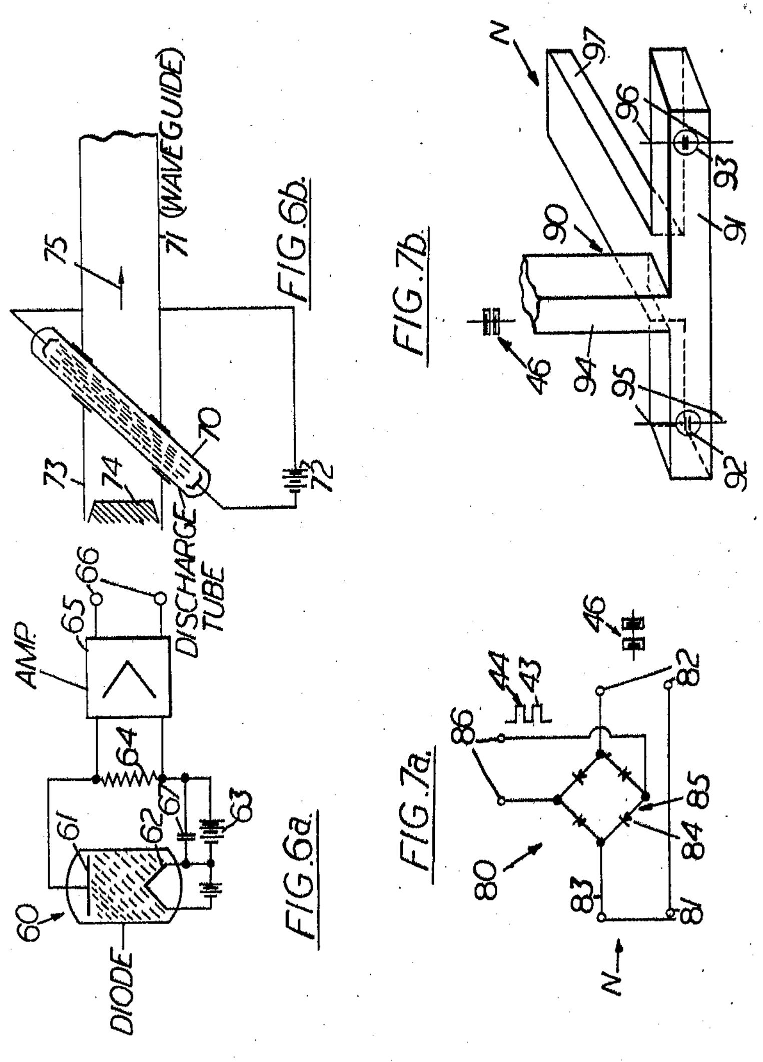

FIGS. 6*a* and 6*b* show two examples of the white noise generators for use in FIG. 3.

Figure 8B:
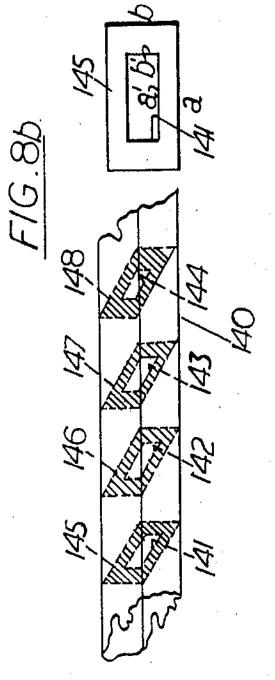
Figure 8A:
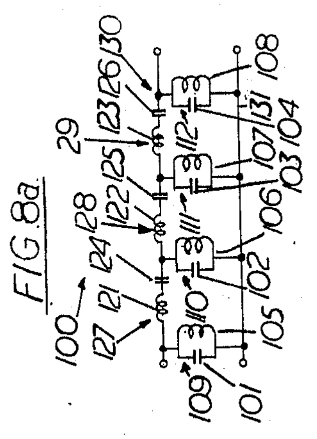

FIGS. 7*a* and 7*b* illustrate examples of switching circuits which may be utilized in the invention, and FIGS. 8*a* and 8*b* illustrate examples of Gaussian type bandpass filters for use in the invention.

A conventional frequency division multiplex pulse communication system will now be explained with reference to FIGS. 1 and 2. In the transmitting equipment 10 in FIG. 1, the oscillator OSC1 supplies the power (the frequency of which is $f_1$) to a switching circuit S1. From the signal input terminal TS1 a coded pulse train, which corresponds to information to be transmitted, is applied to the switching circuit S1. The power supplied from oscillator OSC1 is then interrupted, by switching circuit S1, corresponding to the arrival of the above-mentioned pulse train, thus transforming the output power from OSC1 into a coded pulse signal. The coded pulse signal is applied to a band pass filter FIL S1, having a center frequency $f_1$, in order to limit the frequency band and shape the wave form of the signal. The output of the bandpass filter FIL S1 is the PCM signal of the first channel CH1, and the center frequency of the signal is $f_1$.

Figure 1:
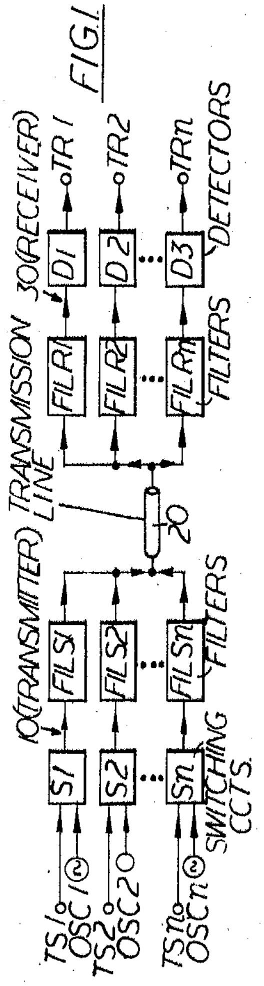
FIG.1 PRIOR ART
FIG. 1 shows a block diagram of a conventional frequency division multiplex pulse communication system.
Figure 2:
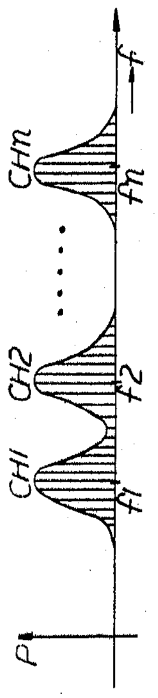
FIG.2 PRIOR ART
FIG. 2 illustrates the frequency spectrum of the signal transmitted along the transmission line in the communication system shown in FIG. 1.

Assuming that the number of channels of this frequency division multiplex PCM system is $n$, PCM signals of first, second, . . . , and $n$th channels as shown in FIG. 1 ($CH_1$, $CH_2$ . . . $CH_n$) and having frequencies $f_1$, $f_2$, . . . $f_n$ respectively are obtained. In this description, let us assume that the lowest frequency is $f_1$, and the frequency increases in the order of $f_2$, $f_3$, . . . $f_n$.

PCM signals of the first, second, . . . $n$th channels, $CH_1$, $CH_2$, . . . $CH_n$, which are produced by the transmitting equipment 10, are transmitted to a single transmission line 20. The frequency spectrum of the multiplexed PCM signal in the transmission line 20 is shown in FIG. 2, where the abscissa and the ordinate indicate the frequency and signal power respectively, of the PCM signal.

At the receiving equipment 30 in FIG. 1, the frequency division multiplex PCM signals, which are transmitted through the transmission line 20, are applied to the channel receiving bandpass filters FIL $R_1$, FIL $R_2$, . . . FIL $R_n$. If the multiplex PCM signals are transmitted through the transmission line without changing their frequency allocations, then the center frequencies of the bandpass filters correspond to $f_1$, $f_2$, . . . $f_n$, respectively. However, if the center frequencies of the multiplex signals are shifted simultaneously, then the center frequencies of the filters correspond to the frequencies after they are shifted. Now, each PCM signal for each channel is separated by the filters and these signals are then detected at the detecting circuits $D_1$, $D_2$, . . . $D_n$, respectively. At the output terminals $TR_1$, $TR_2$, . . . $TR_n$, pulse trains corresponding to the pulse trains applied to the transmitting terminals $TS_1$ etc. are reproduced.

As described in the introduction clauses, in such a frequency division multiplex pulse communication system, $n$ oscillators $OSC_1$ to $OSC_n$ having oscillation frequencies $f_1$ to $f_n$ are required. Moreover, the frequencies of these oscillators must be strictly stabilized. This is very expensive and moreover it is technically difficult to provide a number of stabilized oscillators, in particular, in the microwave region, and more particularly the millimeter wave region.

In order to remove the above difficulties, it is suggested that a single pulse generator be employed, instead of a group of oscillators; the pulse generator generating a train of narrow pulses having a flat power spectrum, in the frequency region covering $f_1$ to $f_n$, and repeating with a predetermined frequency equal to the greatest common measure of the center frequencies of the channels. Since, however, it is very difficult to provide such a pulse generator in the microwave or millimeter wave region, the present invention provides an improved FDM pulse communication system, having a number of salient technical merits such as stabilized operation, by employing a single white noise generator instead of oscillators such as OSC1 or the single pulse generator mentioned above.

The features and principles of the invention will now be more clearly described with reference to FIGS. 3–5.

In the transmitter 40 of FIG. 3 the white noise output from the white noise generator N, later to be explained in detail in connection with FIG. 6, which generates a wave having a substantially flat frequency spectrum of power within the frequency band to be used, is applied to the switching circuits $S_1$, $S_2$, . . . $S_n$ of the corresponding channels (to be described in detail with reference to FIG. 7). On the other hand, the input pulse trains representative of corresponding informations to be transmitted are applied to the switching circuits from the signal input terminals $TS_1$, $TS_2$, . . . $TS_n$. Since the switching circuits, such as $S_1$, become "on" at the existence of the train of pulses applied thereto, then at each output terminal of the switching circuits, intermittent noise and namely, a pulse code signal composed of pulsed noise will be obtained. The noise output power of the noise generator N is substantially flat over the necessary frequency band, and therefore, the pulsed noise signal level of each switching circuit is nearly flat. Although the output of the white noise generator N is referred to as "output" in the instant specification, the output may be an electric field intensity, voltage or current.

Figures 4, 5:
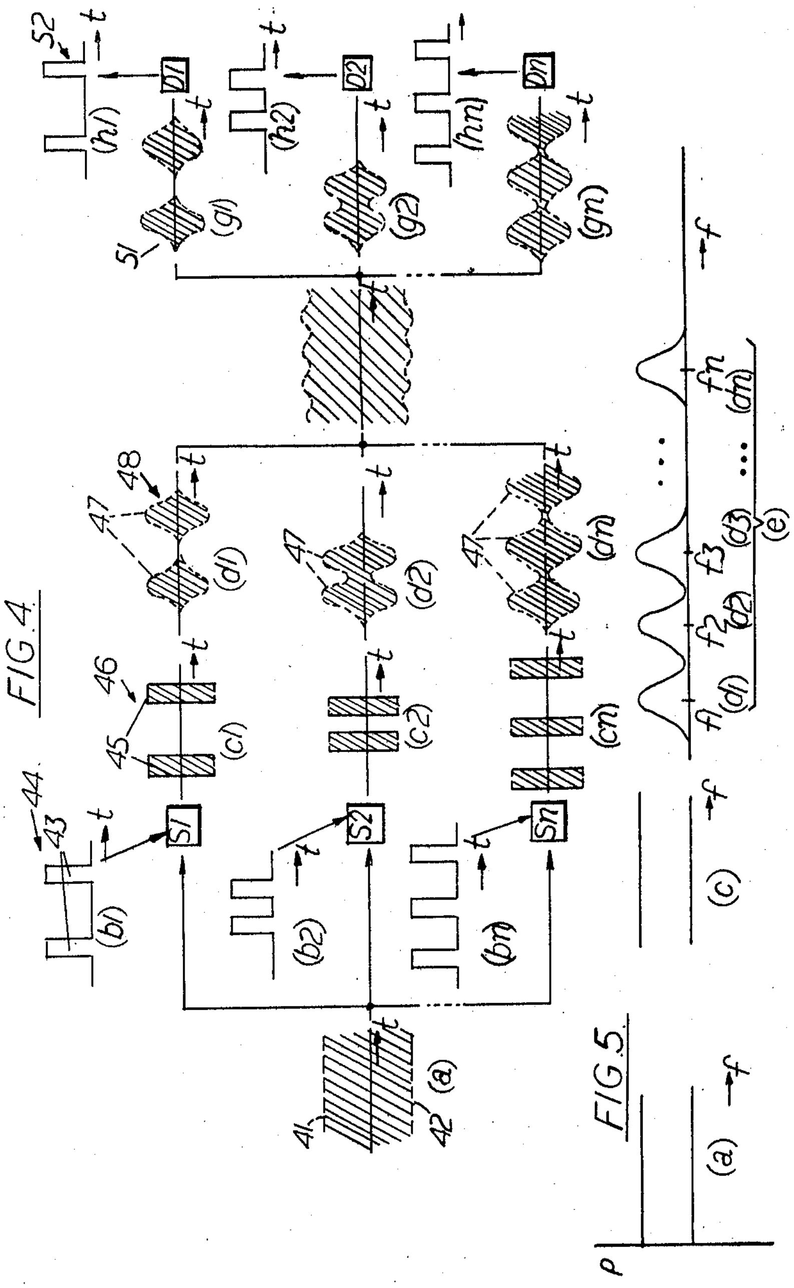
FIG. 4 illustrates the wave forms at various points in the circuitry of FIG. 3.
FIG. 5 shows the frequency spectrum of the signal at the above-mentioned points in the circuit.

FIG. 4 illustrates the variation with time of the signal at various points of the transmitter 40, transmission line 20, and receiver 50 with the output as the ordinate and time as the abscissa. FIG. 5 shows a power frequency spectrum at those points; with power as the ordinate and frequency as the abscissa. Since the variation of the noise output of the white noise generator N, namely, the output at the point ($a$) shown in FIG. 3 is very irregular, only the statistical characteristics measured over a considerably long time being definite, it cannot be accurately illustrated, however, it is conceptionally illustrated in FIG. 4, point ($a$). In this drawing, since the intensity of the output forms, statistically a Gaussian distribution, line-symmetrical with respect to the zero level of intensity, i.e., the abscissa, the probability of the occurrence of low intensity noise (nearly equal to zero level) is the greatest and that of the high intensity noise (the absolute value of which is very large) is substantially zero. Therefore, to illustrate the probability of a certain intensity level in FIG. 4, point ($a$), it is necessary to illustrate the Gaussian distribution around the abscissa by indicating heavy and thin lines in the direction of the ordinate. Moreover, in order to illustrate the whole output level including that of substantially zero probability, the lines should extend infinitely to the upper and lower sides of the abscissa. In FIG. 4, point ($a$) therefore, dotted lines 41 and 42 indicate a certain output level having a certain probability of occurrence, while the hatched portion indicates output levels which have large probability of occurrence. Other illustrations except ($b_1$), ($b_2$), . . . ($b_n$); ($h_1$), ($h_2$), . . . ($h_n$) are drawn from a point of view similar to the above. The frequency spectrum of the output of the white noise generator N shown in FIG. 5 point ($a$) is substantially flat at least over the frequency band to be used.

The train of pulses from input terminals, namely the signal power at the points $b_1$, $b_2$, . . . $b_n$ in FIG. 3 comprise pulses, the positions, amplitudes or both of which vary in response to information to be transmitted, and which correspond to the train of pulses 44 composed of the pulses 43 as shown by ($b_1$), ($b_2$), . . . ($b_n$) in FIG. 4. The output signals of the switching circuits switched by the train of pulses, i.e., the signals at the points $c_1$, $c_2$, . . . $c_n$ shown in FIG. 3 are, from the viewpoint of time, pulse coded signals 46 having the pulsed noise 45 in the interval of the pulse 43 as shown by ($c_1$), ($c_2$), . . . ($c_n$) in FIG. 4, whereas, from the viewpoint of frequency, they are distributed substantially flat in each channel over the necesary frequency band when the pulse noise 45 exists.

These pulse coded signals from the switching circuits (shown by ($c_1$), ($c_2$) and ($c_n$) in FIG. 4 and by ($c$) in FIG. 5), are applied to the so-called Gaussian filters, FIL $S'_1$, FIL $S'_2$, . . . FIL $S'_n$ (explained hereunder with reference to FIG. 8). It is preferable to employ a Gaussian type bandpass filter for each channel since it gives a Gaussian distribution of the passing signal around the center frequency $f_1$ which is to be the center frequency of a certain channel. A square sinusoidal type filter may also be employed, as well as general bandpass filters of other types which pass only a predetermined frequency bandwidth and suppress the rest of the band. The frequency spectrum of the output of the filter FIL S'1, FIL S'2, etc., i.e., the output signals at the points $d_1$, $d_2$, . . . $d_n$ shown in FIG. 3, are maintained in Gaussian distribution around the frequencies $f_1$, $f_2$, . . . $f_n$, as shown by ($d_1$), ($d_2$), . . . ($d_n$), in FIG. 5, when the pulsed noise power 45 shown by ($c_1$), ($c_2$), etc. in FIG. 4 exists. The variation of the output signals at the points $d_1$, $d_2$, etc. are shown by ($d_1$), ($d_2$), . . . ($d_n$) in FIG. 4. As will be understood from FIG. 4, the output signals at these points constitute a PCM signal 48 comprising wave noise 47 which has substantially a Gaussian distribution in relation to time.

In the transmitter 40, in order to make the explanation simple, the switching circuit S1, and the filter FIL S'1 are assumed to be connected in tandem. The switching circuits can, however, be inserted between two filters which are also connected in tandem. In lieu of maintaining the switching circuits and the filters as separate elements, a bandpass filter comprising means for intermittently suppressing with time the noise output of the white noise generator in response to the input pulse train, e.g., a switching filter, may also be employed.

The PCM signal, which is obtained from the transmitting equipment 40 in FIG. 3, is applied to a transmission line 20 as in the case of the conventional frequency division multiplex PCM system shown in FIG. 1. It does not matter whether the transmission line 20 is open wire, coaxial line, waveguide, etc., or electromagnetic wave propagation in air. Since the multiplex PCM signal power at the transmission line 20, i.e. at the point $e$ shown in FIG. 3, is a superposition of the PCM signals 48 shown at ($d_1$) and so forth in FIG. 4, it will appear as shown in FIG. 4, point ($e$) from the viewpoint of time, whereas, it will be illustrated as shown in FIG. 5 point ($e$) from the viewpoint of frequency.

At the receiving equipment 50 in FIG. 3, the signals transmitted through the transmission line 20 are applied to Gaussian type bandpass filters FIL R'1, FIL R'2, . . . FIL R'$n$ allocated to each channel. The filters are preferably Gaussian type bandpass filters; however, conventionally used bandpass filters which are able to separate the channels by frequency and suppress extraneous noise may be used in the receiving equipment 50, even when Gaussian type filters are employed in the transmitter. At the output of filters FIL R'1 etc., there appear channel PCM signals each separated corresponding to the center frequencies of the filters. These output signals at the points $g_1$, $g_2$, . . . $g_n$ in FIG. 3, are illustrated by ($g_1$), ($g_2$), . . . ($g_n$) in FIG. 4 as PCM signals 51. The PCM signals are demodulated by the demodulating circuits $D_1$, $D_2$, . . . $D_n$ in FIG. 3. The output signals of these detectors, namely the power at the points $h_1$, $h_2$, . . . $h_n$, are a train of pulses 52 each corresponding to the train of pulses 44 shown as $(b_1)$ in FIG. 4. In the demodulating circuits sampling is also performed, in addition to demodulation, in order to reproduce the pulse train 52 from the PCM signal 51, however, when this invention is applied to data transmission, it is only necessary to demodulate the PCM signals 51.

FIG. 6(*a*) shows a circuit diagram for a white noise generator N which is applicable to the general carrier wave or microwave frequency region. In this circuit, a voltage is produced across load resistance 64, which is connected in series with the positive side of voltage source 63 and between the anode 61 and cathode 62 of the noise generating diode 60. This voltage is applied to amplifier 65 which has a substantially constant gain over the necessary frequency region. The above-mentioned noise output is produced at the output terminal 66. Capacitor 67 is an A.C. bypass for source 63. The noise generating diode may be such as described in a paper by J. D. Cobine and C. J. Gallagher, disclosed in "Journal of Applied Physics" vol. 18, p. 110 (January 1949 issue) or in the paper entitled "Coaxial Diode Noise Source for UHF": by Harwick Johnson, disclosed in the "RCA Review" (March 1947 issue).

FIG. 6(*b*) shows an axial section of a white noise generator N applicable to the microwave or millimeter-wave region. A noise generating discharge tube 70 is inserted obliquely with reference to a waveguide 71, while power is supplied to it from the power source 72. An example of such a discharge tube may be found in Mr. W. W. Mumford's paper disclosed on "Bell System Technical Journal," vol. 28, p. 608 (October 1949 issue). The cut-off frequency of the waveguide 71 is selected higher than the upper limit of the necessary frequency band. At an end of the waveguide 71, an impedance matching element 74 is installed to insure maximum noise power up the guide (direction of the arrow 75). In case the frequency range of the system includes that of light waves an incandescent electric lamp may be utilized as the noise generator N. A high power white noise generator may be obtained from plasma oscillation excited by high voltage.

FIG. 7(*a*) shows a switching circuit ($S_1$ etc. FIG. 3) 80, suitable for the general carrier wave frequency or microwave frequency region, comprising a bridging circuit 85 including semiconductor elements 84 inserted into a lead wire 83 which connects the input terminal 81 and output terminal 82. Each arm of this bridge is arranged to change its impedance when the pulse train 44 is applied to the signal input terminals 86, corresponding to the signal input terminals TS in FIG. 3. In the circuit 80, the noise output power supplied from the white noise generator N through the terminals 81, arrives at the output terminals 82 only when the pulse 43 exists at the signal input terminals 86. Thus the pulse coded signal illustrated by $(c_1)$ in FIG. 4 is obtained at 82.

FIG. 7(*b*) is a perspective view of a switching device 90 suitable for the microwave or millimeter wave region. The device 90 is constituted by a magic-tee waveguide and two variable capacitance diodes 92 and 93 installed on the magnetic field arm 91 of the waveguide at points suitably distant from the junction of the arm 91 and the electric field arm 94. The connections 95 and 96 are provided in order to apply voltages and thus change the impedance of the waveguide. When a train of pulses is applied, from one of the input terminals, such as TS1 shown in FIG. 3, to 95 and 96, the capacities of the variable capacitance diodes 92 and 93 change. This change in capacitance results in a change in the phase relation of the electromagnetic field inside of the waveguide, and thus, as is well known about the nature of the magic-tee, the noise power supplied from the white noise generator N to the magnetic field branch arm 97 passes to the electric field arm of the magic-tee 94. In the absence of a pulse, however, the output power diminishes. Thus the pulse coded signal 46 corresponding to the input train of pulses 43 is obtained at the output of the arm 94.

FIG. 8 shows the construction of Gaussian type bandpass filters which may be used for FIL S′ and FIL R′. FIG. 8(*a*) shows the circuit diagram of a filter 100 suitable for the general carrier frequency and microwave frequency regions. The capacitors 101, 102, 103 and 104 having capacitances $C_1$, $C_3$, $C_5$ and $C_7$, respectively, and the coils 105, 106, 107 and 108 having inductances $L_1$, $L_3$, $L_5$ and $L_7$, respectively are paired in parallel, resulting in the parallel resonant circuits 109, 110, 111 and 112. These circuits are further inter-connected by the series resonant circuits 127, 128 and 129 comprising coils 121, 122 and 123 having inductances $L_2$, $L_4$ and $L_6$, respectively, and capacitors 124, 125 and 126 having capacitances $C_2$, $C_4$ and $C_6$, respectively. By selecting the capacitances $C_1$, $C_2$, $C_3$, $C_4$, $C_5$, $C_6$ and $C_7$, and the inductances $L_1$, $L_2$, $L_3$, $L_4$, $L_5$, $L_6$ and $L_7$ corresponding to the values calculated by the following Formulae 1, a Gaussian type bandpass filter having center frequency $f_0$ can be obtained, as described in Mr. Louis Weinberg's paper disclosed in the "Journal of Franklin Institute," August 1957 issue, page 127.

$$\left.\begin{array}{l} L_{2i-1}\text{ (inductance of parallel arm)}=(W/2\pi f_0^2)(1/A_{2i-1}) \\ C_{2i-1}\text{ (capacitance of parallel arm)}=(\tfrac{1}{2}\pi WR)A_{2i-1} \\ L_{2i}\text{ (inductance of series arm)}=(R/2\pi W)(1/A_{2i}) \\ C_{2i}\text{ (capacitance of series arm)}=(W/2\pi f_0^2 R)A_{2i} \end{array}\right\} \quad (1)$$

where: R stands for the nominal impedance of the circuit; W is equal to $1/\pi T$ assuming that T is the width of the pulse; and $A_i$ is equal to 0.7677, 0.3744, 0.2944, 0.2378, 0.1778, 0.1104 and 0.0375, for the values 1, 2, . . . 7 of I, respectively.

FIG. 8(*b*) is a perspective view of a Gaussian type bandpass filter suitable for the microwave or millimeter wave region. Plates of conductive material 145, 146, 147 and 148 having openings 141, 142, 143 and 144, respectively, at the central portions thereof, are placed every $\lambda_g/4$ ($\lambda_g$ is the wavelength in the waveguide) measured along the axis of the waveguide 140 (which has an upper cut-off frequency higher than the upper limit of the passband of the filter). The areas of the openings 141, 142, 143 and 144 can be calculated from the following Equations 2 and 3, wherein W, R, $f_0$, and $A_i$ correspond to Formulae 1.

For the odd numbered plates:

$$\left.\begin{array}{l} 2\pi WR\cdot A_{2i-1}=(\lambda_g/a)\cot^2(\pi a'/a) \\ (WR/2\pi f_0^2)\cdot A_{2i-2}=p(4b/\lambda_g)\log\operatorname{cosec}(\pi b'/2b) \end{array}\right\} \quad (2)$$

For the even numbered plates:

$$\left.\begin{array}{l} (2\pi f_0^2/WR)\cdot A_{2i}=(\lambda_g/a)\cot^2(\pi a'/a) \\ (\tfrac{1}{2}\pi WR)\cdot A_{2i}=p(4b/\lambda_g)\log\operatorname{cosec}(\pi b'/2b \end{array}\right\} \quad (3)$$

where, $$p=(\pi/4)^2[(a^2-a'^2)/aa']\cdot[1-(\lambda/2a')^2]/[1-(\lambda/2a)^2]\sec^2(\pi a'/2a)$$

As explained above, according to the present invention, only a single white noise generator is required instead of the number of strictly stabilized oscillators which are indispensable to the conventional frequency division multiplex pulse communication system, and therefore, inspection and repair can be facilitated. Moreover, the conventional oscillator is very expensive and of short life, whereas, the frequency stability of the present invention depends only upon the stability of the filters at the sending and receiving sides, and therefore, only the output level of the white noise generator is required to be stabilized. Since this can be done rather easily the necessity of amplifier 65 (FIG. 6*a*) may be obviated in some cases.

Moreover, in the conventional frequency division multiplex pulse communication system, close stabilization of the filters employed is a requisite. Whereas, according to the present invention, since a single white noise generator is employed, the frequency stability of the system is solely dependent upon the relative stability of the filters as contrasted with their individual absolute stability. That is, even if the center frequencies of the filters of the sending side or of the receiving side or of both are shifted by a certain value, the communication system according to the present invention can still be operated in a stabilized condition. Accordingly, by constituting all of the filters of the same material, so that as between them they have the same relative stability, a very stable system may be maintained so long as the output level of the white noise generator is fairly constant.

Since white noise is utilized in this invention, the signal power of the multiplex PCM signal in the transmission line can be defined by only a statistical characteristic; the instantaneous waveform being quite random. This signal power is regarded as the entropy power as described in Mr. C. E. Shannon's paper entitled "A Mathematical Theory of Communication" disclosed in the "Bell System Technical Journal," vol. 27, pp. 379–423 and pp. 623–656 (July and October issues, 1948), and the amount of information which can be transmitted by a unit of transmitting power is near to the maximum value.

The described system may be applied to the range from the general carrier wave frequencies to nearly light wave frequencies. In the carrier wave frequency region, the conventional carrier current supplying device generally utilizes pulses and hence this carrier current supplying device is rather economical and has technical merit. The advantages of the present invention in a multiplex PCM system inhabiting the wave region will be understood in view of the fact that the generation of millimeter waves by noise has been conventionally used.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. A frequency division pulse communication system comprising a source of white noise, a plurality of distinctive filters coupled to said source for selecting a plurality of distinct bands of frequencies, a common transmission means coupled to said filters, and means for modulating each frequency band with a separate source of signals.

2. A frequency division pulse communication system as claimed in claim 1 further comprising a plurality of filters frequency matched on a one-to-one basis to said distinctive filters and coupled to said transmission means for receiving the transmitted signals and separating them into distinct frequency bands, and means for demodulating each of said bands.

3. A frequency division pulse communication system having a plurality of signal inputs, a source of white noise, a plurality of modulating switching circuits coupled in common to said source of noise, a separate distinctive bandpass filter in series with each of said switching circuits, and a common transmission means coupled to all of the filters in common, said switching circuits being further connected to said signal inputs on a one-to-one basis whereby each series circuit by virtue of the switch and filter contributes a distinctive pulse modulated frequency band to the transmission means.

4. A frequency division pulse communication system as claimed in claim 3 further comprising a plurality of filters frequency matched on a one-to-one basis to said distinctive filters and coupled to said transmission means for receiving the transmitted signals and separating them into distinct frequency bands, and means for demodulating each of said bands.

5. A frequency division pulse communication system as defined in claim 3 wherein each of said bandpass filters is a Gaussian filter.

References Cited by the Examiner

UNITED STATES PATENTS

| | | | |
|---|---|---|---|
| 2,565,409 | 8/1951 | Thompson | 179—15 |
| 2,624,836 | 1/1953 | Dicke | 325—130 |
| 2,974,198 | 3/1961 | McLeod | 331—78 |
| 3,205,310 | 9/1965 | Schlichte | 179—15 |

DAVID G. REDINBAUGH, *Primary Examiner.*

J. McHUGH, *Assistant Examiner.*